(12) United States Patent
Ferro et al.

(10) Patent No.: US 12,323,798 B2
(45) Date of Patent: Jun. 3, 2025

(54) SYSTEMS AND METHODS FOR DYNAMIC ACCESS AND MOBILITY POLICY REFRESH IN WIRELESS NETWORKS

(71) Applicant: Verizon Patent and Licensing Inc., Basking Ridge, NJ (US)

(72) Inventors: Javier A. Ferro, Somerset, NJ (US); Barry F. Hoffner, Bridgewater, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 233 days.

(21) Appl. No.: 18/169,921

(22) Filed: Feb. 16, 2023

(65) Prior Publication Data

US 2024/0284176 A1   Aug. 22, 2024

(51) Int. Cl.
*H04L 29/06*   (2006.01)
*H04W 12/08*   (2021.01)
*H04W 12/37*   (2021.01)

(52) U.S. Cl.
CPC .......... *H04W 12/08* (2013.01); *H04W 12/37* (2021.01)

(58) Field of Classification Search
CPC ............................. H04W 12/08; H04W 12/37
See application file for complete search history.

(56) References Cited

U.S. PATENT DOCUMENTS

| 2006/0277590 A1* | 12/2006 | Limont | H04L 67/34 726/1 |
| 2007/0088948 A1* | 4/2007 | Ji | H04W 12/128 713/166 |
| 2014/0298484 A1* | 10/2014 | Sung | H04W 12/08 726/27 |

(Continued)

FOREIGN PATENT DOCUMENTS

| WO | WO-2022188839 A1 * | 9/2022 | ............. H04L 63/10 |
| WO | WO-2023067369 A1 * | 4/2023 | ............... H04L 1/08 |

OTHER PUBLICATIONS

Third Generation Partnership Project, "Technical Specification Group Core Network and Terminals; 5G System; Access and Mobility Policy Control Service; Stage 3 (Release 18)," 3GPP TS 29.507 V18.0.0 (Dec. 2022).

(Continued)

*Primary Examiner* — Ka Shan Choy

(57) ABSTRACT

A system described herein may output a first access policy request associated with a User Equipment ("UE"). The system may receive a first access policy in response to the first access policy request, and may identify, after receiving the first access policy, that the first access policy has expired. The system may output, based on identifying that the first access policy has expired, a second access policy request associated with the UE, may receive a second access policy in response to the second access policy request, and may output the second access policy to at least one of the UE, or a radio access network ("RAN") to which the UE is con- (Continued)

nected. The RAN may provide access to the UE in accordance with the first access policy until receiving the second access policy, after which the RAN may provide access to the UE in accordance with the second access policy.

20 Claims, 7 Drawing Sheets

(56) References Cited

U.S. PATENT DOCUMENTS

| | | | | |
|---|---|---|---|---|
| 2014/0351880 | A1* | 11/2014 | Low | H04W 12/00 726/1 |
| 2015/0050922 | A1* | 2/2015 | Ramalingam | H04W 4/50 455/418 |
| 2020/0394861 | A1* | 12/2020 | Meruva | G07C 9/28 |
| 2022/0312209 | A1* | 9/2022 | Stenfelt | H04W 36/12 |

OTHER PUBLICATIONS

Third Generation Partnership Project, "Technical Specification Group Core Network and Terminals; 5G System; UE Policy Control Service; Stage 3 (Release 18)," 3GPP TS 29.525 V18.0.0 (Dec. 2022).

* cited by examiner

SYSTEMS AND METHODS FOR DYNAMIC ACCESS AND MOBILITY POLICY REFRESH IN WIRELESS NETWORKS

BACKGROUND

Wireless networks, such as Fifth Generation ("5G") networks, may include a radio access network ("RAN") via which User Equipment ("UEs"), such as mobile telephones, tablet devices, Internet of Things ("IoT") devices, or other wireless communication devices, may receive wireless service. RANs may utilize access and mobility policies for UEs, which may indicate radio access technologies ("RATs") and/or frequency bands that are authorized to be used by particular UEs (e.g., a 5G RAT, a Long-Term Evolution ("LTE") RAT, etc.), amounts of radio frequency ("RF") resources to allocate to particular UEs, and/or other suitable policies.

DETAILED DESCRIPTION OF EXAMPLE EMBODIMENTS

The following detailed description refers to the accompanying drawings. The same reference numbers in different drawings may identify the same or similar elements.

Figure 1A:
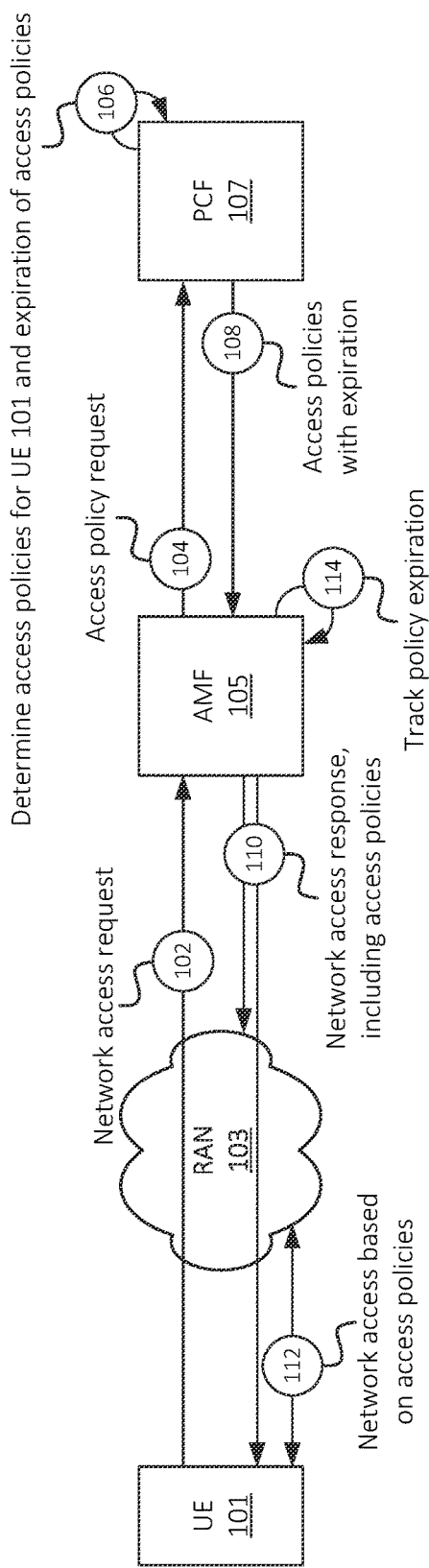
FIGS. 1A and 1B illustrate an example overview of one or more embodiments described herein.

Embodiments described herein provide for the dynamic updating or refreshing of access and mobility policies (referred to herein simply as "access policies" for the sake of brevity) in a wireless network. As shown in FIG. 1A, for example, a particular UE 101 may request (at 102) access to particular RAN 103. RAN 103 may be communicatively coupled to a core network that provides routing services, authentication services, or other suitable services for UEs 101 that are connected via RAN 103. RAN 103 may also provide access policies for UEs 101 that are connected via RAN 103, which may indicate RATs or frequency bands that particular UEs 101 are authorized to use, RF resource allocations for UEs 101 connected via RAN 103, and/or other suitable policies. In some embodiments, the core network may be a 5G core ("5GC") or other type of core network.

In some embodiments, the request (at 102) may be sent via an N1 interface, may be sent using Non-Access Stratum ("NAS") messaging, and/or some other suitable protocol, interface, or message type, based on which the request is received by an access and/or mobility element of the core network, such as Access and Mobility Management Function ("AMF") 105. The request may include an identifier of UE 101 (e.g., a Subscription Permanent Identifier ("SUPI"), a Globally Unique Temporary Identifier ("GUTI"), an International Mobile Subscriber Identity ("IMSI") value, an International Mobile Station Equipment Identity ("IMEI") value, a Mobile Directory Number ("MDN"), and/or other suitable identifier) and/or other suitable information based on which AMF 105 may identify or determine one or more access policies for UE 101 based on the request. In some embodiments, AMF 105 may receive or identify additional or different information associated with UE 101, such as a location or tracking area ("TA") of UE 101, an identifier of a cell or base station (e.g., a Next Generation Node B ("gNB")) to which UE 101 is connected, or other suitable information.

AMF 105 may request (at 104) access policies associated with UE 101 from a policy element of the core network, such as PCF 107. In some embodiments, as discussed below, AMF 105 may request (at 104) access policies associated with UE 101 from some other policy element of the core network. For example, in some embodiments, the core network may include multiple policy elements that provide different types of access policies. Such different policy elements may include an access and mobility PCF ("AM-PCF"), a UE PCF ("UE-PCF"), a session management PCF ("SM-PCF"), etc. While described in the context of operations relating to PCF 107, in practice, similar concepts may apply to operations performed by an AM-PCF, a UE-PCF, an SM-PCF, or other suitable policy element.

PCF 107 may determine (at 106) a set of access policies for UE 101. For example, PCF 107 may identify access policies matching particular criteria (e.g., matching an identifier of UE 101, a location of UE 101, a device type of UE 101, and/or other suitable criteria). Additionally, or alternatively, PCF 107 may receive or derive access policies based on information received from one or more other elements of the core network, such as a Unified Data Management function ("UDM"), a Unified Data Repository ("UDR"), or the like.

In accordance with some embodiments, PCF 107 may further determine (at 106) an expiration associated with the determined access policies. The expiration may be a specific date and/or time, may be a duration (e.g., 12 hours, 24 hours, etc.), and/or may be some other indicator of temporal criteria. In some embodiments, PCF 107 may additionally determine (at 106) an activation time associated with the determined access policies, which may indicate a specific data and/or time, a timing offset, etc. indicating when the access policies are to be implemented and/or when the access policies are valid (e.g., at some point in the future). In some embodiments, PCF 107 may determine (at 106) multiple access policies associated with different times (e.g., having different activation times and/or expirations).

PCF 107 may provide (at 108) the determined access policies, as well as the expiration and/or activation time of such access policies, to AMF 105 (e.g., as an access policy response, in response to the access policy request (at 104) provided by AMF 105). As discussed below, the expiration may generally be used to indicate how long the access policies (received at 108) are valid, and the activation time may generally be used to indicate when the access policies are valid. The reasons for a given set of access policies having a duration or expiration may vary. In any event, as discussed below, the expiration of the access policies may be used as a trigger (e.g., by AMF 105) to determine an updated set of access policies.

AMF 105 may identify a particular set of access policies (e.g., may identify a particular access policy that is currently active, valid, etc. based on the activation time and/or expiration of the received one or more access policies), and may output (at 110) a network access response to UE 101 and/or to RAN 103 (e.g., to one or more base stations of RAN 103), that includes some or all of the received access policies. For example, in some embodiments, AMF 105 may output (at 110) a currently active or valid access policy (e.g., based on an activation time associated with such access policy).

UE 101 may accordingly access (at 112) RAN 103 according to the access policies. For example, RAN 103 may allocate RF resources according to the provided access policies. As another example, RAN 103 may permit UE 101 to utilize, or restrict UE 101 from utilizing, one or more RATs as indicated in the access policies. As yet another example, UE 101 and/or RAN 103 may utilize one or more Quality of Service ("QoS") parameters (e.g., 5G QoS Identifier ("5QI") values) for traffic to and/or from UE 101 based on the access policies.

AMF 105 may further track (at 114) an expiration, duration, etc. of the received access policies. For example, AMF 105 may use one or more timers or other suitable mechanisms to track the expiration of the received access policies. In some embodiments, AMF 105 may maintain multiple timers that each correspond to different access policies (e.g., for the same UE 101 or for different UEs 101), such that AMF 105 is able to simultaneously and/or asynchronously track the expiration of different access policies with different expirations.

Figure 1B:
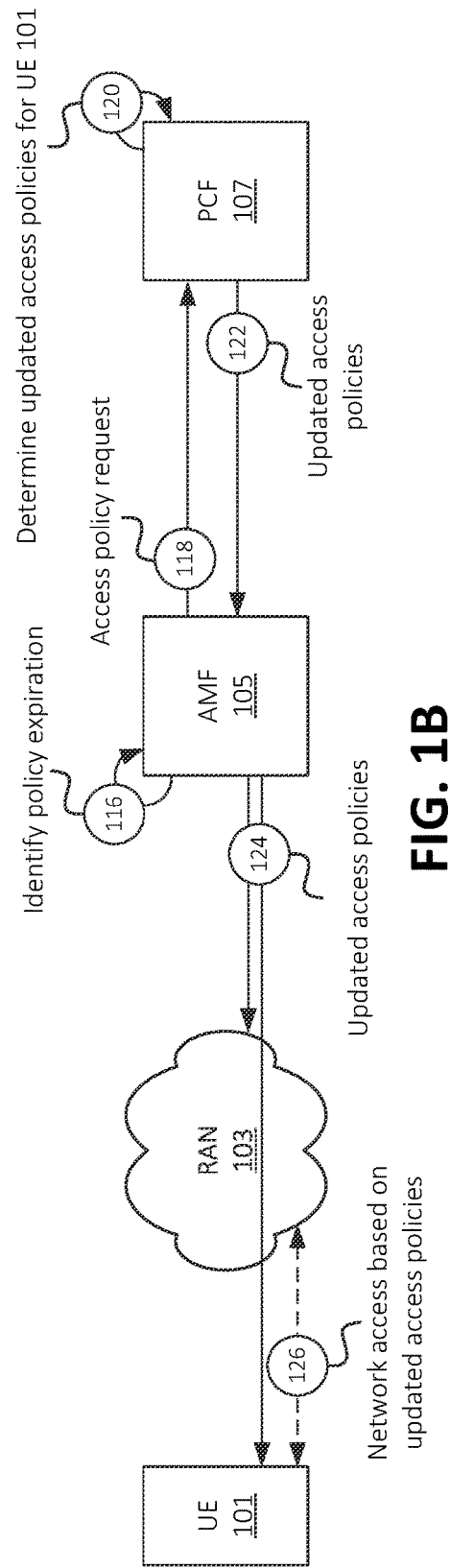

As shown in FIG. 1B, at some point, AMF 105 may identify (at 116) an expiration of the access policies associated with UE 101 (e.g., as received at 108). Based on identifying (at 116) the expiration of the access policies associated with UE 101, AMF 105 may again request (at 118) access policies, associated with UE 101, from PCF 107. PCF 107 may, based on receiving the subsequent request from AMF 105, determine (at 120) access policies associated with UE 101. The access policies (determined at 120) may be updated access policies, such as access policies that were modified or updated after the initial access policy request (at 104), and/or access policies that were otherwise provided or made available after the initial access policy request (at 104).

PCF 107 may provide (at 122) the updated access policies, associated with UE 101, to AMF 105, which may provide (at 124) the updated access policies to RAN 103 and/or to UE 101. UE 101 may accordingly receive (at 126) network access, via RAN 103, in accordance with the updated access policies, which may be different from the initially implemented (e.g., at 112) access policies. For example, the updated access policies may specify different RATs, RF resource allocations, QoS parameters, etc. than the initially implemented access policies. In some embodiments, the updated access policies may also be associated with an expiration, duration, etc. In such scenarios, AMF 105 may track an expiration of the updated access policies (e.g., similar to the tracking at 114), and may output yet another access policy request (e.g., similar to the request at 118) in order to receive further updated access policies associated with UE 101. Further, in some embodiments, some access policies may be associated with an expiration or duration, while other access policies may not be associated with an expiration or duration. In some embodiments, in lieu of requesting (at 118) access policies from PCF 107 when identifying (at 116) the expiration of a particular set of access policies, AMF 105 may identify another applicable set of access policies (e.g., may revert to a "default" set of access policies, may identify another set of access policies with an activation time or other suitable criteria, etc.) to implement, which may include a previously received (e.g., at 108 and/or at some other time) set of access policies.

Figure 2:
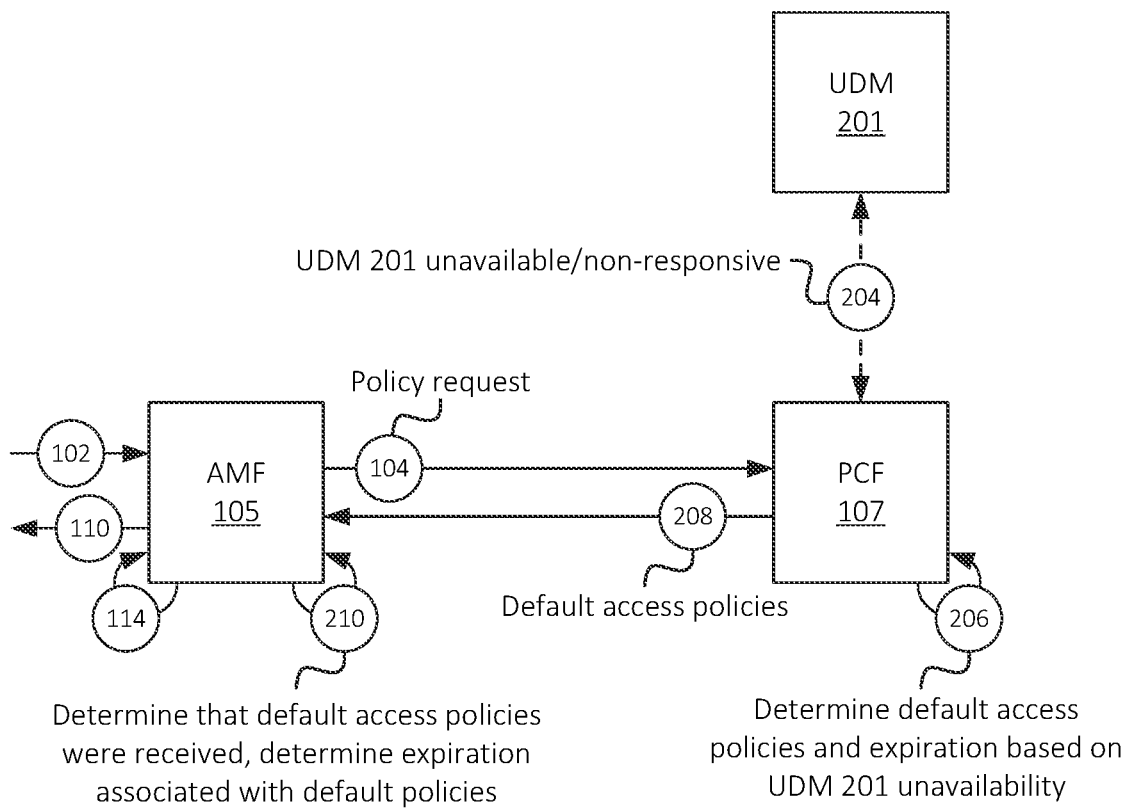
FIGS. 2-4 illustrate examples of different scenarios in which a set of access policies with an expiration may be identified, in accordance with some embodiments.
Figure 3:
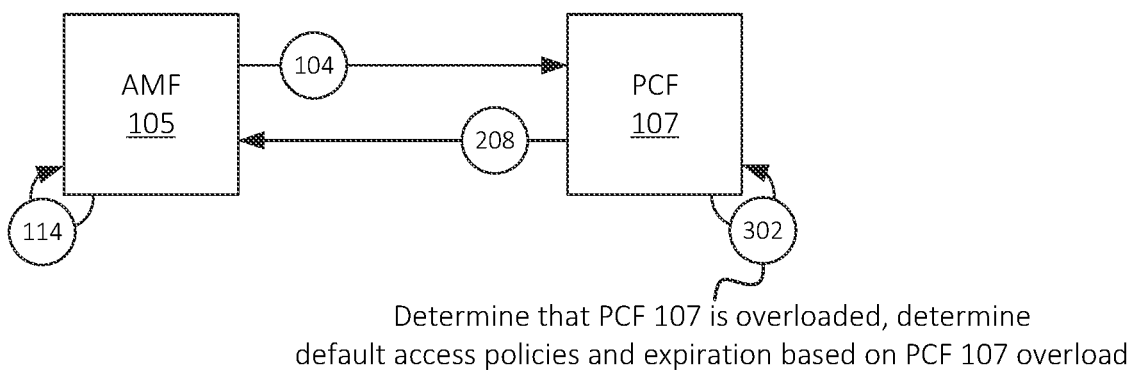
Figure 4:
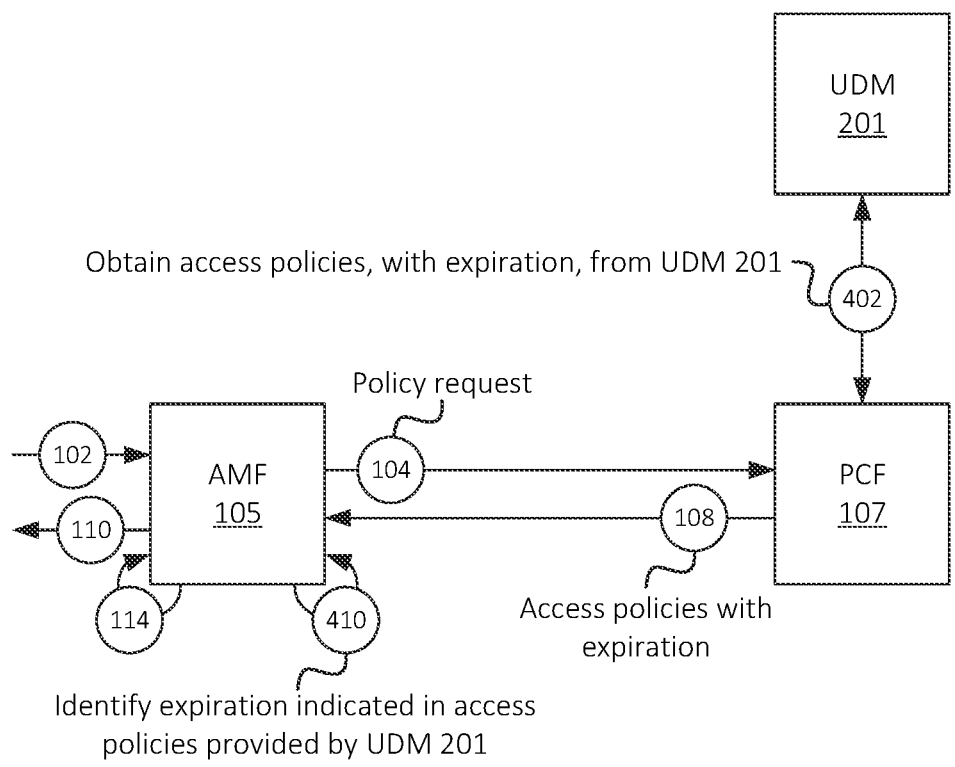

FIGS. 2-4 illustrate example scenarios in which an expiration associated with one or more access policies may be determined or identified. As shown in FIG. 2, for example, AMF 105 may request (at 104) access policies, associated with a given UE 101 (e.g., based on an access request at 102). Based on receiving the request (at 104), PCF 107 may attempt to obtain (at 204) access policies and/or other information associated with UE 101, based on which access policies may be determined or derived, from UDM 201. Although examples are provided herein in the context of UDM 201, in some embodiments one or more other types of devices, systems, network functions, etc. may perform the operations described with respect to UDM 201 (e.g., a UDR or some other suitable device, system, or network function).

In some scenarios, the attempt to obtain such information from UDM 201 may be unsuccessful. For example, UDM 201 may be unavailable or non-responsive, such as in situations where UDM 201 is overloaded, situations where a route or other communication pathway between PCF 107 and UDM 201 is congested or non-operational, situations where UDM 201 is experiencing a hardware failure, and/or other scenarios. PCF 107 may determine, for example, that at least a threshold amount of time has passed between outputting (at 204) a request to UDM 201, and not receiving a response to the request. In some embodiments, PCF 107 may use some other suitable technique to determine that UDM 201 has not responded to the request from PCF 107.

Based on the unavailability of UDM 201 (e.g., based on not receiving the requested information from UDM 201), PCF 107 may determine (at 206) a "default" set of access policies, and/or may otherwise determine access policies based on information other than information that would have been received from UDM 201. That is, in some situations, access policies determined based on information received from 201 may have been different from the default access policies, but in the absence of the information UDM 201, PCF 107 may "fall back" on the default access policies.

PCF 107 may further provide (at 208) the default access policies to AMF 105, in response to the policy request (at 104) from AMF 105. In some embodiments, when providing the default access policies, PCF 107 may indicate that the provided (at 208) access policies are a default set of access policies, may indicate that the provided policies are not based on information received from UDM 201, and/or may otherwise indicate that the access policies are (or may potentially be) incomplete or inaccurate.

Based on receiving (at 208) the default access policies, AMF 105 may determine an expiration associated with the received default access policies. For example, PCF 107 may include, with the default access policies, an indication of an expiration or duration of the default access policies. Additionally, or alternatively, AMF 105 may maintain information indicating that default access policies are associated with a particular expiration or duration. In such embodiments, AMF 105 may determine the expiration of the default access policies without receiving an explicit indication of the expiration of the default access policies when such policies are provided (at 208) by PCF 107. As discussed above, once AMF 105 determines (at 210) the expiration associated with the default access policies, AMF 105 may track (at 114) the expiration of the default access policies, and may re-request (e.g., at 118) the access policies associated with UE 101 from PCF 107 upon expiration of the default access policies.

FIG. 3 illustrates another example situation in which PCF 107 determines a default set of access policies. As shown, PCF 107 may receive (at 104) a policy request from AMF 105. PCF 107 may determine (at 302) that PCF 107 is overloaded. For example, PCF 107 may identify that a queue of access policy requests (e.g., from AMF 105 and/or from other sources) is full or over capacity, may identify that network resources associated with PCF 107 are congested (e.g., such that requesting information from UDM 201 may take longer than a threshold amount of time), and/or may otherwise determine that PCF 107 is overloaded. As such, PCF 107 may determine (at 302) a default set of access policies, and may provide (at 208) the default set of access policies to AMF 105. As similarly noted above, AMF 105 may determine an expiration of the default access policies (e.g., based on an indication that the access policies are a default set of access policies), and/or PCF 107 may include the expiration of the default access policies when providing (at 208) the default access policies to AMF 105.

FIG. 4 illustrates another example in which access policies may be associated with an expiration, in accordance with some embodiments. As shown, AMF 105 may output (at 104) a policy request to PCF 107. PCF 107 may obtain (at 402) one or more access policies, and/or information based on which access policies may be derived, from UDM 201. In some embodiments, the obtained access policies (or other suitable information) may include information indicating an expiration associated with such access policies. Additionally, or alternatively, the obtained information may include one or more conditions or other information, based on which PCF 107 may identify an expiration of the access policies provided by UDM 201 (and/or access policies determined based on information provided by UDM 201). PCF 107 may accordingly provide (at 108) the access policies, including the expiration associated with the access policies, to AMF 105. AMF 105 may identify (at 410) the expiration associated with the provided (at 108) access policies, and may further output (at 110) the access policies (e.g., to UE 101 and/or RAN 103). Further, as discussed above, AMF 105 may track (at 114) the expiration of the access policies, and may re-request (e.g., at 118) the access policies for UE 101 upon expiration of the access policies.

Figure 5:
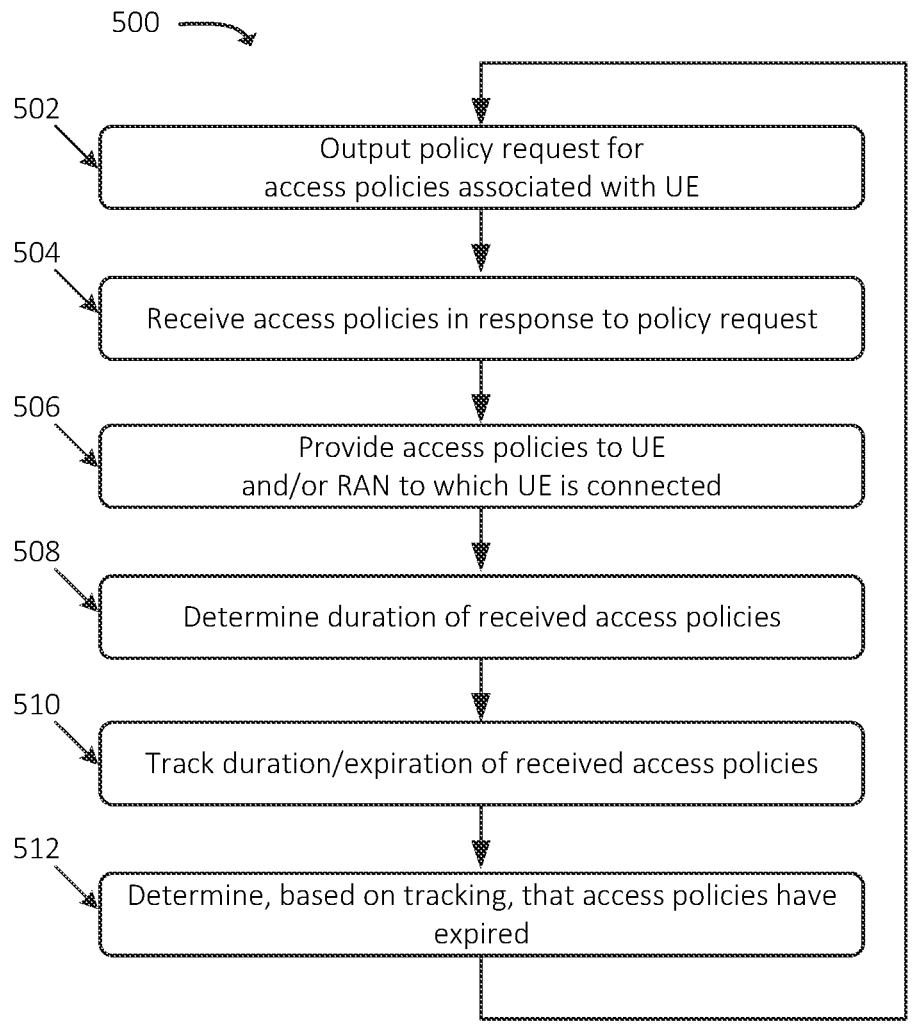
FIG. 5 illustrates an example process for dynamically refreshing access policies associated with a given UE, in accordance with some embodiments.

FIG. 5 illustrates an example process 500 for dynamically refreshing access policies associated with a given UE 101. In some embodiments, some or all of process 500 may be performed by AMF 105. In some embodiments, one or more other devices may perform some or all of process 500 in concert with, and/or in lieu of, AMF 105.

As shown, process 500 may include outputting (at 502) a policy request for access policies associated with UE 101. For example, as discussed above, AMF 105 may output a policy request to a policy element of a core network, such as to PCF 107 of a 5GC. AMF 105 may output the policy request based on, for example, receiving a request from UE 101, and/or RAN 103 to which UE 101 is connected, for the access policies. UE 101 and/or RAN 103 may request the access policies based on an access request by UE 101, a handover request received by RAN 103, and/or other suitable triggering events.

As discussed above, PCF 107 may determine a set of access policies for UE 101 based on information provided in the request, such as an identifier of UE 101, a location of UE 101, etc. Additionally, or alternatively, PCF 107 may obtain additional information from one or more other sources, such as UDM 201, a UDR, etc., based on which PCF 107 may determine access policies for UE 101. As also discussed above, in some situations, the set of access policies may be a default set of access policies (or otherwise may not be based on information received from UDM 201, a UDR, etc.), such as in situations where PCF 107 is overloaded, UDM 201 is unreachable, etc.

Process 500 may further include receiving (at 504) a set of access policies in response to the policy request. For example, PCF 107 may provide the requested access policies associated with UE 101 to AMF 105. Process 500 may additionally include providing (at 506) the access policies to UE 101 and/or to RAN 103 to which UE 101 is connected. As discussed above, RAN 103 may provide wireless service to UE 101 in accordance with such access policies, such as providing access to particular RATs or frequency bands, providing access to particular QoS parameters, providing RF resources to UE 101 in accordance with the access policies, etc.

Process 500 may also include determining (at 508) a duration of the access policies. As discussed above, the access policies may include, or may be provided with, an indication of a duration or time of expiration of the access policies. For example, the access policies themselves may include the duration or time of expiration (e.g., UDM 201, PCF 107, and/or some other source may provide information indicating the duration or time of expiration of the access policies). Additionally, or alternatively, AMF 105 may determine a duration or time of expiration of the access policies, such as when the access policies are provided with a particular identifier or indicator (e.g., an identifier or indicator that the access policies are "default" access policies or some other suitable classification or type of access policies). For example, AMF 105 may maintain information associating particular classifications or types (e.g., default or some other classification or type of access policy) with particular durations or times of expiration.

Process 500 may further include tracking (at 510) the duration or expiration of the received access policies. For example, AMF 105 may initiate a timer or may utilize some other suitable mechanism to track the duration of the access policies (e.g., how long the access are valid), and/or to determine when the access policies have expired (e.g., when the access policies are no longer valid).

Process 500 may additionally include determining (at 512), based on the tracking, that the access policies have expired. For example, some time after receiving (at 504) the access policies, AMF 105 may determine that the access policies have expired and/or are otherwise no longer valid. For example, the duration associated with the access policies may have elapsed, the timer may have reached a particular value (e.g., a countdown timer that has reached zero, a timer that has incremented to the duration, etc.). Once the access policies have expired, AMF 105 may refresh the access policies for UE 101 by outputting (at a next iteration of operation 502) a subsequent policy request for access policies associated with UE 101.

Figure 6:
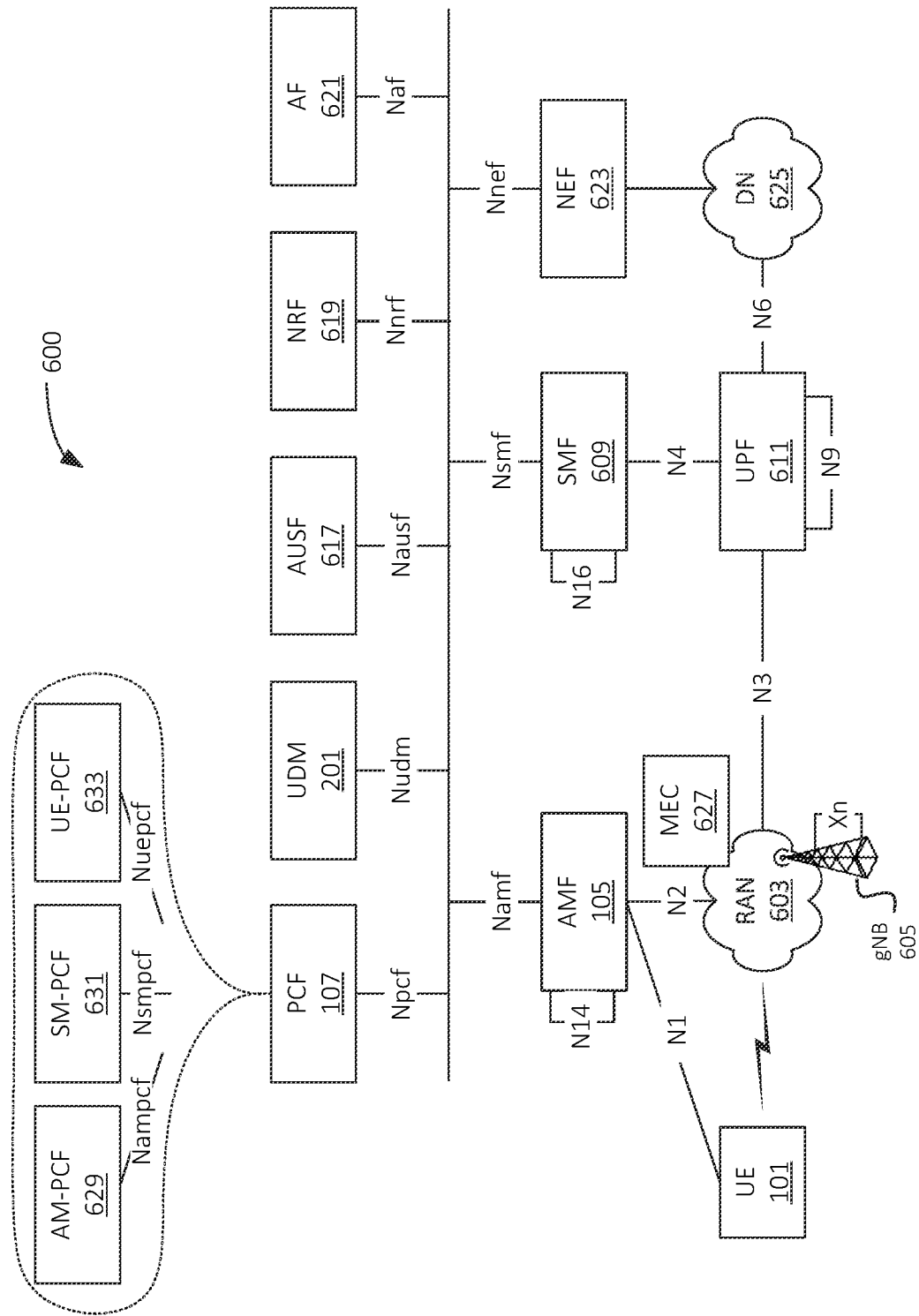
FIG. 6 illustrates an example environment in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Standalone ("SA") architecture, in which a 5G radio access technology ("RAT") may be used to provide a wireless interface between UE 601 and a core network, such as a 5G core ("5GC"). In some embodiments, environment 600 may correspond to a 5G Non-Standalone ("NSA") architecture, in which a 5G RAT may be used in conjunction with one or more other RATs (e.g., a Long-Term Evolution ("LTE") RAT). In some embodiments, environment 600 may include a 5GC, in which 5GC network elements perform one or more operations described herein. In some embodiments, environment 600 may include, may implement, and/or may be implemented by a converged packet core, in which 5GC elements and elements of one or more other types of core networks (e.g., an Evolved Packet Core ("EPC")) may be implemented.

As shown, environment 600 may include UE 601, RAN 603 (which may include one or more Next Generation Node Bs ("gNBs") 605) and various network functions, which may be implemented as Virtualized Network Functions ("VNF s"), Cloud-Native Network Functions ("CNFs"), etc. Such network functions may include AMF 105, Session Management Function ("SMF") 609, User Plane Function ("UPF") 611, PCF 107, UDM 201, Authentication Server Function ("AUSF") 617, Network Repository Function ("NRF") 619, Application Function ("AF") 621, and Network Exposure Function ("NEF") 623. Environment 600 may also include or may be communicatively coupled to one or more networks, such as Data Network ("DN") 625. Environment 600 may include one or more additional devices or systems communicatively coupled to one or more networks (e.g., DN 625).

The example shown in FIG. 6 illustrates one instance of each network component or function (e.g., one instance of SMF 609, UPF 611, PCF 107, UDM 201, AUSF 617, etc.). In practice, environment 600 may include multiple instances of such components or functions. For example, in some embodiments, environment 600 may include multiple "slices" of a core network, where each slice includes a discrete and/or logical set of network functions (e.g., one slice may include a first instance of SMF 609, PCF 107, UPF 611, etc., while another slice may include a second instance of SMF 609, PCF 107, UPF 611, etc.). Additionally, or alternatively, one or more of the network functions of environment 600 may implement multiple network slices. The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include interfaces shown in FIG. 6 and/or one or more interfaces not explicitly shown in FIG. 6. These interfaces may include interfaces between specific network functions, such as an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N16 interface, an N26 interface, and/or one or more other interfaces. In some embodiments, one or more elements of environment 600 may communicate via a service-based architecture ("SBA"), in which a routing mesh or other suitable routing mechanism may route communications to particular network functions based on interfaces or identifiers associated with such network functions. Such interfaces may include or may be referred to as Service-Based Interfaces ("SBIs"), including an Namf interface (e.g., indicating communications to be routed to AMF 105), an Nudm interface (e.g., indicating communications to be routed to UDM 201), an Npcf interface, an Nupf interface, an Nnef interface, an Nsmf interface, an Nnrf interface, an Naf interface, and/or one or more other SBIs.

UE 601 may include a computation and communication device, such as a wireless mobile communication device that is capable of communicating with one or more RANs (e.g., RAN 603 and/or some other type of RAN or access network), DN 625, and/or other networks. UE 601 may be, or may include, a mobile telephone, a personal communications system ("PCS") terminal (e.g., a device that combines a cellular radiotelephone with data processing and data communications capabilities), a personal digital assistant ("PDA"), a smart phone, a laptop computer, a tablet computer, a camera, a personal gaming system, an Internet of Things ("IoT") device (e.g., which may include one or more sensors, a smart home appliance, etc.), a wearable device, a Machine-to-Machine ("M2M") device, or another type of mobile computation and communication device. UE 601 may send traffic (e.g., user plane traffic) to and/or receive traffic from DN 625 via RAN 603 and/or UPF 611.

RAN 603 may be, or may include, a 5G RAN that includes one or more base stations (e.g., one or more gNBs 605), via which UE 601 may wirelessly communicate with one or more other elements of environment 600. UE 601 may communicate with RAN 603 via an air interface (e.g., as provided by gNB 605). For instance, RAN 603 may receive uplink traffic (e.g., user plane traffic such as voice call traffic, data traffic, messaging traffic, etc.) from UE 601 via the air interface, and may communicate the uplink user plane traffic to UPF 611 and/or one or more other devices or networks. Further, RAN 603 may receive uplink signaling traffic, control plane traffic, etc. (e.g., Non-Access Stratum ("NAS") signaling) from UE 601 via the air interface, and may communicate such uplink signaling traffic, control plane traffic, etc. to AMF 105 and/or one or more other devices or networks. Additionally, RAN 603 may receive downlink traffic for UE 601 (e.g., user plane traffic from UPF 611, control plane traffic from AMF 105, and/or downlink traffic from one or more other devices or networks) and may communicate the downlink traffic to UE 601 via the air interface.

In some embodiments, RAN 603 may include or may be communicatively coupled to one or more Multi-Access/Mobile Edge Computing ("MEC") devices 627, referred to sometimes herein simply as "MECs" 627. MECs 627 may include hardware resources (e.g., configurable or provisionable hardware resources) that may be configured to provide services and/or otherwise process traffic to and/or from UE 601, via RAN 603 (e.g., via a respective gNB 605. For example, RAN 603 may route some traffic, from UE 601, to MEC 627 instead of to a core network (e.g., instead of to UPF 611). MEC 627 may process the traffic, perform one or more computations based on the received traffic, and may provide traffic to UE 601 via RAN 603. In some embodiments, MEC 627 may include, and/or may implement, some or all of the functionality described above with respect to UPF 611, AF 621, and/or one or more other devices, systems, VNFs, CNFs, etc. In this manner, ultra-low latency services may be provided to UE 601, as traffic does not need to traverse links (e.g., a backhaul network) between RAN 603 and the core network.

AMF 105 may include one or more devices, systems, VNFs, CNFs, etc., that perform operations to register UE 601 with the 5GC, to facilitate or authorize the establishment of radio bearer channels between UE 601 and RAN 603, to hand off UE 601 from RAN 603 to another network (e.g., another RAN), to hand in UE 601 to RAN 603 from another network, manage mobility of UE 601 between RANs 603 and/or gNBs 605, and/or to perform other operations. In some embodiments, AMF 105 may indicate, to UE 601 and/or to RAN 603, access and/or mobility parameters, such as RATs that UE 601 is authorized to utilize, network slices (e.g., Network Slice Selection Assistance Information ("NS-SAI") values or other network slice indicators) UE 601 is authorized to utilize, radio frequency ("RF") resource allocation parameters for UE 601, and/or other suitable access and/or mobility parameters. In some embodiments, environment 600 may include multiple AMFs 105, which may communicate with each other via the N14 interface (denoted in FIG. 6 by the line marked "N14" originating and terminating at AMF 105).

SMF 609 may include one or more devices, systems, VNFs, CNFs, etc., that gather, process, store, and/or provide information in a manner described herein. SMF 609 may, for example, facilitate the establishment of communication sessions on behalf of UE 601. Such communication sessions may include protocol data unit ("PDU") sessions between UE 601 and UPF 611. In some embodiments, the establishment of communications sessions may be performed in accordance with one or more policies provided by PCF 107 (e.g., based on communications between SMF 609 and PCF 107 via an N7 interface). For example, SMF 609 may verify that UE 601 is authorized to utilize a particular network slice or set of QoS parameters prior to establishing a requested communication session, according to the particular network slice or QoS parameters, on behalf of UE 601 (e.g., between UE 601 and UPF 611).

UPF 611 may include one or more devices, systems, VNFs, CNFs, etc., that receive, route, process, and/or forward traffic (e.g., user plane traffic). As discussed above, UPF 611 may communicate with UE 601 via one or more communication sessions, such as PDU sessions. Such PDU sessions may be associated with a particular network slice or other suitable QoS parameters, as noted above. UPF 611 may receive downlink user plane traffic (e.g., voice call traffic, data traffic, etc. destined for UE 601) from DN 625, and may forward the downlink user plane traffic toward UE 601 (e.g., via RAN 603). In some embodiments, multiple UPFs 635 may be deployed (e.g., in different geographical locations), and the delivery of content to UE 601 may be coordinated via the N9 interface. Similarly, UPF 611 may receive uplink traffic from UE 601 (e.g., via RAN 603), and may forward the traffic toward DN 625. In some embodiments, UPF 611 may communicate (e.g., via the N4 interface) with SMF 609, regarding user plane data processed by UPF 611 (e.g., to provide analytics or reporting information, to receive policy and/or authorization information, etc.).

PCF 107 may include one or more devices, systems, VNFs, CNFs, etc., that aggregate, derive, generate, etc. policy information associated with the 5GC and/or UEs 601 that communicate via the 5GC and/or RAN 603. PCF 107 may receive information regarding policies and/or subscriptions from one or more sources, such as subscriber databases (e.g., UDM 201, a Unified Data Repository ("UDR"), etc.), and/or from one or more users such as, for example, an administrator associated with PCF 107. In some embodiments, the functionality of PCF 107 may be split into multiple network functions, such as AM-PCF 629, SM-PCF 631, UE-PCF 633, and so on. Such different "split" PCFs may be associated with respective SBIs (e.g., AM-PCF 629 may be associated with an Nampcf SBI, SM-PCF 631 may be associated with an Nsmpcf SBI, UE-PCF 633 may be associated with an Nuepcf SBI, and so on) via which other network functions may communicate with the split PCFs. The split PCFs may maintain information regarding policies associated with different devices, systems, and/or network functions.

UDM 201 and AUSF 617 may include one or more devices, systems, VNFs, CNFs, etc., that manage, update, and/or store, in one or more memory devices associated with AUSF 617 and/or UDM 201, profile and/or policy information associated with a subscriber. In some embodiments, UDM 201 may include, may be communicatively coupled to, may be implemented by, and/or may otherwise be associated with one or more other types of user or device information repositories, such as a UDR. AUSF 617 may perform authentication, authorization, and/or accounting operations associated with the subscriber and/or a communication session with UE 601.

NRF 619 may include one or more devices, systems, VNFs, CNFs, etc. that maintain routing and/or network topology information associated with the 5GC. For example, NRF 619 may maintain and/or provide Internet Protocol ("IP") addresses of one or more network functions, routes associated with one or more network functions, discovery and/or mapping information associated with particular network functions or network function instances (e.g., whereby such discovery and/or mapping information may facilitate the SBA), and/or other suitable information.

AF 621 may include one or more devices, systems, VNFs, CNFs, etc., that receive, store, and/or provide information that may be used in determining parameters (e.g., quality of service parameters, charging parameters, or the like) for certain services or applications, and/or to provide such services or applications to UE 601.

NEF 623 include one or more devices, systems, VNFs, CNFs, etc. that provide access to information, application programming interfaces ("APIs"), and/or other operations or mechanisms of the 5GC to devices or systems that are external to the 5GC. NEF 623 may maintain authorization and/or authentication information associated with such external devices or systems, such that NEF 623 is able to provide information, that is authorized to be provided, to the external devices or systems. Such information may be received from other network functions of the 5GC (e.g., as authorized by an administrator or other suitable entity associated with the 5GC), such as SMF 609, UPF 611, a charging function ("CHF") of the 5GC, and/or other suitable network function. NEF 623 may communicate with external devices or systems via DN 625 and/or other suitable communication pathways.

DN 625 may include one or more wired and/or wireless networks. For example, DN 625 may include an IP-based Packet Data Network ("PDN"), a wide area network ("WAN") such as the Internet, a private enterprise network, and/or one or more other networks. UE 601 may communicate, through DN 625, with application servers, other UEs 601, and/or to other devices or systems that are communicatively coupled to DN 625. DN 625 may be connected to one or more other networks, such as a public switched telephone network ("PSTN"), a public land mobile network ("PLMN"), and/or another network. DN 625 may be connected to one or more devices, such as content providers, applications, web servers, and/or other devices, with which UE 601 may communicate.

While environment 600 is described in the context of a 5GC, as noted above, environment 600 may, in some embodiments, include or implement one or more other types of core networks. For example, in some embodiments, environment 600 may be or may include a converged packet core, in which one or more elements may perform some or all of the functionality of one or more 5GC network functions and/or one or more EPC network functions. For example, in some embodiments, AMF 105 may include, may implement, and/or may be implemented by a Mobility Management Entity ("MIME"); SMF 609 may include, may implement, and/or may be implemented by a Serving Gateway ("SGW"); UPF 611 may include, may implement, and/or may be implemented by a PDN Gateway ("PGW"); PCF 107 may include, may implement, and/or may be implemented by a Policy Charging and Rules Function ("PCRF"); UDM 201 may include, may implement, and/or may be implemented by a Home Subscriber Server ("HSS"); NEF 623 may include, may implement, and/or may be implemented by a Service Capability Exposure Function ("SCEF"); and so on.

Figure 7:
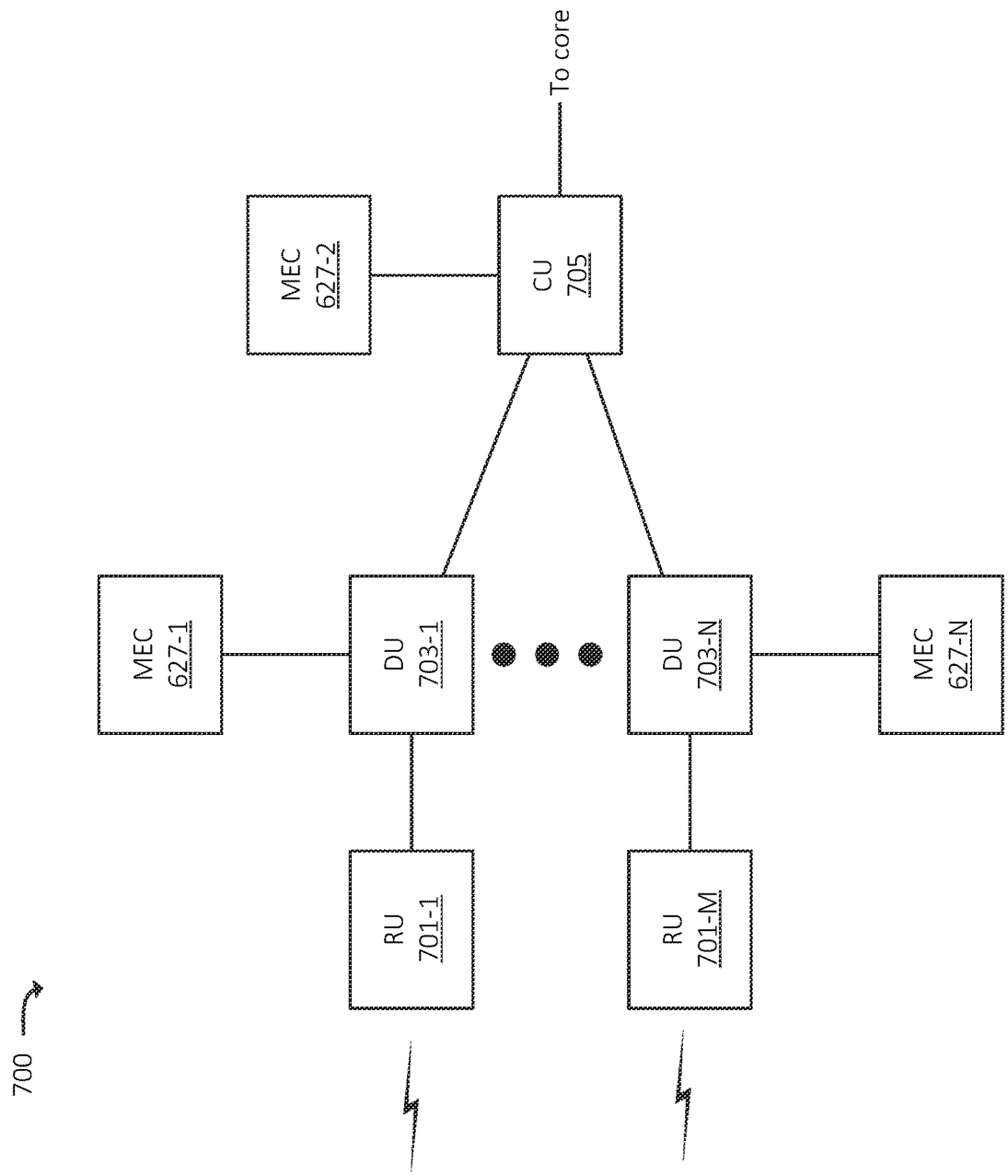
FIG. 7 illustrates an example arrangement of a RAN, in accordance with some embodiments.

FIG. 7 illustrates an example RAN environment 700, which may be included in and/or implemented by one or more RANs (e.g., RAN 603 or some other RAN). In some embodiments, a particular RAN 603 may include one RAN environment 700. In some embodiments, a particular RAN 603 may include multiple RAN environments 700. In some embodiments, RAN environment 700 may correspond to a particular gNB 611 of RAN 603. In some embodiments, RAN environment 700 may correspond to multiple gNBs 611. In some embodiments, RAN environment 700 may correspond to one or more other types of base stations of one or more other types of RANs. As shown, RAN environment 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 201 and/or UPF 611). In the uplink direction (e.g., for traffic from UEs 601 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based on the RLC packets) on the traffic received from DUs 703.

In accordance with some embodiments, CU 705 may receive downlink traffic (e.g., traffic from the core network) for a particular UE 601, and may determine which DU(s) 703 should receive the downlink traffic. DU 703 may include one or more devices that transmit traffic between a core network (e.g., via CU 705) and UE 601 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 601.

RU 701 may include hardware circuitry (e.g., one or more RF transceivers, antennas, radios, and/or other suitable hardware) to communicate wirelessly (e.g., via an RF interface) with one or more UEs 601, one or more other DUs 703 (e.g., via RUs 701 associated with DUs 703), and/or any other suitable type of device. In the uplink direction, RU 701 may receive traffic from UE 601 and/or another DU 703 via the RF interface and may provide the traffic to DU 703. In the downlink direction, RU 701 may receive traffic from DU 703, and may provide the traffic to UE 601 and/or another DU 703.

As noted above, one or more elements of RAN environment 700 may, in some embodiments, be communicatively coupled to one or more MECs 627. For example, DU 703-1 may be communicatively coupled to MEC 627-1, DU 703-N may be communicatively coupled to MEC 627-N, CU 705 may be communicatively coupled to MEC 627-2, and so on. MECs 627 may include hardware resources (e.g., configurable or provisionable hardware resources) that may be configured to provide services and/or otherwise process traffic to and/or from UE 601, via a respective RU 701.

For example, DU 703-1 may route some traffic, from UE 601, to MEC 627-1 instead of to a core network via CU 705. MEC 627-1 may process the traffic, perform one or more computations based on the received traffic, and may provide traffic to UE 601 via RU 701-1. As noted above, MEC 627 may include, and/or may implement, some or all of the functionality described above with respect to UPF 611, AF 621, and/or one or more other devices, systems, VNFs, CNFs, etc. In this manner, ultra-low latency services may be provided to UE 601, as traffic does not need to traverse DU 703, CU 705, links between DU 703 and CU 705, and an intervening backhaul network between RAN environment 700 and the core network.

Figure 8:
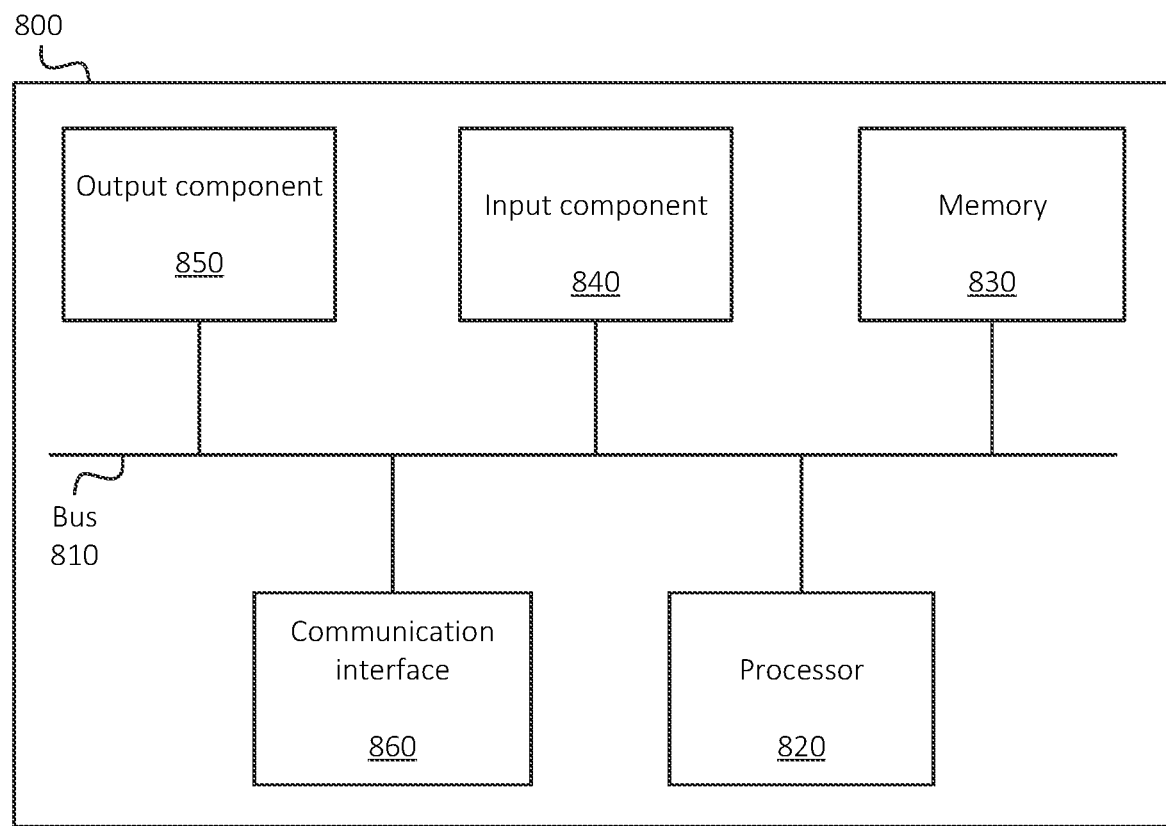
FIG. 8 illustrates example components of one or more devices, in accordance with one or more embodiments described herein.

FIG. 8 illustrates example components of device 800. One or more of the devices described above may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. In some embodiments, processor 820 may be or may include one or more hardware processors. Memory 830 may include any type of dynamic storage device that may store information and instructions for execution by processor 820, and/or any type of non-volatile storage device that may store information for use by processor 820.

Input component 840 may include a mechanism that permits an operator to input information to device 800 and/or other receives or detects input from a source external to input component 840, such as a touchpad, a touchscreen, a keyboard, a keypad, a button, a switch, a microphone or other audio input component, etc. In some embodiments, input component 840 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more hardware processors configured to:
output a first access policy request associated with a User Equipment ("UE");
receive a first access policy in response to the first access policy request, wherein receiving the first access policy includes receiving an indication that the first access policy is a default access policy;
determine a duration of the first access policy based on the indication that the first access policy is a default access policy;

identify, after receiving the first access policy, that the first access policy has expired, wherein determining that the first access policy has expired includes determining that the duration has elapsed after receiving the first access policy;

output, based on identifying that the first access policy has expired, a second access policy request associated with the UE;

receive a second access policy in response to the second access policy request; and output the second access policy to at least one of:
the UE, or
a radio access network ("RAN") to which the UE is connected.

2. The device of claim 1, wherein outputting the first and second access policy requests includes outputting the first and second access policy requests to a policy element of a core network.

3. The device of claim 2, wherein the policy element includes a Policy Control Function ("PCF") of a Fifth Generation core ("5GC").

4. The device of claim 1, wherein receiving the first access policy includes receiving an indication of the duration of the first access policy.

5. The device of claim 4, wherein the duration is based on information provided by at least one of:
a Unified Data Management function ("UDM"), or
a Unified Data Repository ("UDR").

6. The device of claim 1, wherein the one or more hardware processors are further configured to:
output the first access policy to at least one of:
the UE, or
the RAN,
wherein the RAN provides access to the UE in accordance with the first access policy until the second access policy is outputted to the UE or the RAN, wherein the RAN provides access to the UE in accordance with the second access policy after the second access policy is outputted to the UE or the RAN.

7. The device of claim 1, wherein receiving the first access policy includes receiving the first access policy from a network element without receiving an explicit indication of the duration of the first access policy from the network element.

8. A non-transitory computer-readable medium, storing a plurality of processor-executable instructions to:
output a first access policy request associated with a User Equipment ("UE");
receive a first access policy in response to the first access policy request, wherein receiving the first access policy includes receiving an indication that the first access policy is a default access policy;
determine a duration of the first access policy based on the indication that the first access policy is a default access policy;
identify, after receiving the first access policy, that the first access policy has expired, wherein determining that the first access policy has expired includes determining that the duration has elapsed after receiving the first access policy;
output, based on identifying that the first access policy has expired, a second access policy request associated with the UE;
receive a second access policy in response to the second access policy request; and
output the second access policy to at least one of:
the UE, or
a radio access network ("RAN") to which the UE is connected.

9. The non-transitory computer-readable medium of claim 8, wherein outputting the first and second access policy requests includes outputting the first and second access policy requests to a policy element of a core network.

10. The non-transitory computer-readable medium of claim 9, wherein the policy element includes a Policy Control Function ("PCF") of a Fifth Generation core ("5GC").

11. The non-transitory computer-readable medium of claim 8, wherein receiving the first access policy includes receiving an indication of the duration of the first access policy.

12. The non-transitory computer-readable medium of claim 11, wherein the duration is based on information provided by at least one of:
a Unified Data Management function ("UDM"), or
a Unified Data Repository ("UDR").

13. The non-transitory computer-readable medium of claim 8, wherein the plurality of processor-executable instructions further include processor-executable instructions to:
output the first access policy to at least one of:
the UE, or
the RAN,
wherein the RAN provides access to the UE in accordance with the first access policy until the second access policy is outputted to the UE or the RAN, wherein the RAN provides access to the UE in accordance with the second access policy after the second access policy is outputted to the UE or the RAN.

14. The non-transitory computer-readable medium of claim 8, wherein receiving the first access policy includes receiving the first access policy from a network element without receiving an explicit indication of the duration of the first access policy from the network element.

15. A method, comprising:
outputting a first access policy request associated with a User Equipment ("UE");
receiving a first access policy in response to the first access policy request, wherein receiving the first access policy includes receiving an indication that the first access policy is a default access policy;
determining a duration of the first access policy based on the indication that the first access policy is a default access policy;
identifying, after receiving the first access policy, that the first access policy has expired, wherein determining that the first access policy has expired includes determining that the duration has elapsed after receiving the first access policy;
outputting, based on identifying that the first access policy has expired, a second access policy request associated with the UE;
receiving a second access policy in response to the second access policy request; and
outputting the second access policy to at least one of:
the UE, or
a radio access network ("RAN") to which the UE is connected.

16. The method of claim 15, wherein outputting the first and second access policy requests includes outputting the first and second access policy requests to a Policy Control Function ("PCF") of a Fifth Generation core ("5GC").

17. The method of claim 15, wherein receiving the first access policy includes receiving an indication of the duration of the first access policy.

18. The method of claim 17, wherein the duration is based on information provided by at least one of:
   a Unified Data Management function ("UDM"), or
   a Unified Data Repository ("UDR").

19. The method of claim 15, further comprising:
   outputting the first access policy to at least one of:
      the UE, or
      the RAN,
   wherein the RAN provides access to the UE in accordance with the first access policy until the second access policy is outputted to the UE or the RAN, wherein the RAN provides access to the UE in accordance with the second access policy after the second access policy is outputted to the UE or the RAN.

20. The method of claim 15, wherein receiving the first access policy includes receiving the first access policy from a network element without receiving an explicit indication of the duration of the first access policy from the network element.

\* \* \* \* \*